United States Patent [19]

Richardson

[11] Patent Number: 5,329,520
[45] Date of Patent: Jul. 12, 1994

[54] HIGH-SPEED FACILITY PROTECTION IN A DIGITAL TELECOMMUNICATIONS SYSTEM

[75] Inventor: C. Douglas Richardson, Dallas, Tex.

[73] Assignee: Alcatel Network Systems, Inc., Richardson, Tex.

[21] Appl. No.: 915,449

[22] Filed: Jul. 17, 1992

[51] Int. Cl.⁵ .............................................. H04L 1/22
[52] U.S. Cl. ..................................... 370/16; 340/827; 359/110; 371/8.2
[58] Field of Search ................................ 370/16, 16.1; 340/825.01, 825.03, 826, 827, 825.8; 359/110; 371/8.1, 8.2, 11.1, 11.2, 20.1

[56] References Cited

U.S. PATENT DOCUMENTS

| | | | |
|---|---|---|---|
| 5,069,521 | 12/1991 | Hardwick | 370/16.1 X |
| 5,073,774 | 12/1991 | Ikawa | 340/827 X |
| 5,115,449 | 5/1992 | Lockyer et al. | 371/8.2 X |
| 5,193,086 | 3/1993 | Satomi et al. | 340/825.01 X |
| 5,198,808 | 3/1993 | Kudo | 370/16 X |
| 5,210,740 | 5/1993 | Anzai et al. | 370/16 |
| 5,218,465 | 6/1993 | Lebby et al. | 370/16 X |

Primary Examiner—Douglas W. Olms
Assistant Examiner—Melvin Marcelo
Attorney, Agent, or Firm—Vinson & Elkins

[57] ABSTRACT

A digital communications system with fast facility protection is disclosed. The system includes at least one digital cross-connect which is in bidirectional communication with east and west routes of the network via east and west transmit ports and east and west receive ports. The cross-connect broadcasts a facility over both the east and west routes, and receives the return facility over one of the routes. The cross-connect monitors the error status of the received facility for hard error conditions and excessive error rates, by way of a distributed processor in communication with the port. In the event of an error, the cross-connect blind switches the facility to the inactive port by way of a receive-end switch, according to a first embodiment. According to another embodiment, a head-end switch is performed, thus allowing for improved flexibility for port assignment in the cross-connect.

14 Claims, 6 Drawing Sheets

HIGH-SPEED FACILITY PROTECTION IN A DIGITAL TELECOMMUNICATIONS SYSTEM

This invention is in the field of digital telecommunications, and is more particularly directed to monitoring and redundancy schemes therein.

BACKGROUND OF THE INVENTION

As is well known in the art, significant advances have been made in telecommunications systems over recent years, particularly in the rate at which information can be communicated. Modern digital telecommunications systems and communication media provide very high bandwidth, such as the 44.736 Mbps data rate provided by the DS-3 data frame standard. Furthermore, conventional fiber optic cable and systems can provide even higher bandwidth and data rates by time-division multiplexing of up to twelve DS-3 lines, providing bandwidth of up to 536.8 Mbps.

These extremely high bandwidths now available in digital telecommunications systems have enabled the communication of large volumes of data at high speeds. Since voice channels require very little bandwidth (on the order of 4 kbps each), a large number of voice channels may now be communicated over a single communication line by way of time division multiplexing. The available bandwidth now also enables the communication of large blocks of digital data from computer-to-computer, as well as digital data representative of other media such as video displays.

Unlike voice transmissions, however, in which some amount of errored signals can be readily tolerated without garbling of the message, the successful transmission of digital data among computers requires high reliability and high quality transmission. Accordingly, conventional digital cross-connects now provide "performance monitoring" (commonly referred to as "PM"), by which the error rate of received digital data is monitored by way of cyclic redundancy check (CRC) and other conventional coding techniques. Such performance monitoring is used to ensure the desired grade of service desired by those telecommunications customers paying premium tariffs for high quality and low error rate communications.

Conventional telecommunications systems also generally provide some amount of redundancy so that failure of a telecommunications line or network element does not result in the loss of the communicated message. Conventional telecommunications systems with performance monitoring have implemented certain alarm conditions by which a human operator is alerted to events such as "loss of signal" and to error rates exceeding various thresholds. In response, the operator can manually switch to a redundant line to again enable communication of the digital data in the system. Of course, the procedure of generating an alarm condition and the manual switching of input/output ports to other lines cannot be effected quickly.

By way of further background, conventional fiber optic terminals (commonly referred to as FOTs) have implemented 1:1 redundancy for the fiber optic lines in a system, with some amount of automatic switching. According to this 1:1 redundancy scheme, the overhead portion of the bandwidth is monitored to determine if a loss-of-signal ("LOS") or alarm indication signal ("AIS") condition is being received. In these FOT 1:1 redundancy schemes, upon receipt of an LOS or AIS signal, the FOT will automatically switch its transmission to the other of the two fiber optic lines, enabling transmission of the data despite the failure of the first fiber optic line.

FIG. 1 illustrates the bandwidth in a conventional 1:1 redundant fiber optic lines 1E, 1W, as received by a conventional fiber optic terminal (FOT) 3. Each of fiber optic lines 1E, 1W in this example are of the OC-12 type, and as such bidirectionally communicate twelve DS-3 lines in time-domain multiplexed fashion. The DS-3 paths occupy much of the available bandwidth, as shown in FIG. 1. According to conventional standards, a portion of the remainder of the bandwidth communicated by fiber optic lines 1E, 1W is reserved for line data, such as framing and synchronization signals, frame identifying signals, and also signals such as LOS and AIS which indicate a line failure somewhere in the system. This line data portion of the bandwidth is also referred to as overhead, as it does not carry any traffic data. Fiber optic terminal 3 is operable to multiplex and de-multiplex the data to and from one of fiber optic cables 1E, 1W, for communication with twelve individual DS-3 lines.

According to the conventional 1:1 redundancy scheme, conventional FOT 3 monitors the line data and switches communication between fiber optic lines 1E, 1W upon receipt of a signal indicating a line failure. However, many conditions other than the LOS and AIS conditions are unacceptable to the telecommunication customer that is demanding high quality communication, particularly where computer data is to be transmitted and received. These other conditions may not be of such degree as to cause loss of an entire line (i.e., all channels or "paths" being communicated along the fiber optic line), but may be due to a hardware failure for a single path within the line. Examples of these other conditions include loss-of-frame ("LOF"), and "soft" errors in which a particular path has experienced a high rate of errored seconds. The mere monitoring of line data by conventional FOT 3 provides no visibility into these other path-related conditions, and as such the redundancy scheme of FIG. 1 is unable to provide the high level of protection desired by certain customers. Conventional FOT 3 thus only provides line protection, and as such requires doubling of the available fiber optic capacity from that required for traffic only, to accomplish such line protection. As such, the utilization of system fiber optic cable is relatively low in such situations.

It is therefore an object of the invention to provide a method and system for providing facility protection for a digital telecommunications system, which monitors path data and provides automatic switching on both hard and soft error conditions.

It is a further object of the present invention to provide such a method and system to provide such protection where the switching time between the primary and secondary lines for a failing path is extremely short, such as on the order of 50 msec or less.

It is a further object of the present invention to provide such a method and system which may be readily implemented into existing cross-connect installations.

It is a further object of the present invention to provide such a method and system in which the possibility of blocking is much reduced.

It is a further object of the present invention to provide such a method and system in a distributed manner in a digital cross-connect.

It is a further object of the present invention to provide such a method and system in which the soft error rate thresholds may be modified.

It is a further object of the present invention to provide such a method and system in which the utilization of fiber optic cables may be increased dramatically.

It is a further object of the present invention to provide such a method and system in which transmission media of different types (e.g., microwave and light wave) may provide protection for one another.

Other objects and advantages of the present invention will become apparent to those of ordinary skill in the art having reference to the following specification together with the drawings.

SUMMARY OF THE INVENTION

The invention may be implemented into a digital telecommunications system to provide facility protection by way of distributed fault sensing and facility switching at the digital cross-connects. According to the present invention, each line has three ports (head, east and west) assigned thereto, with the east and west ports on the system side to be protected, and providing 1:1 redundancy. AIS, LOF and degraded signal conditions are monitored on received paths at the east and west ports (i.e., facilities), and the facility is blind switched to the alternate redundant (east or west) port upon receipt of such conditions. The degraded signal thresholds are preferably different from those that cause measured events in conventional performance monitoring. According to a first embodiment of the invention, the east and west ports for a facility are on the same logical group in the cross-connect, allowing the bridging to be done in the transmit end (3rd stage) in a non-blocking manner. According to a second embodiment of the invention, the logical group limitation is overcome by moving fault monitoring to the transmit side of the head-end port, in accordance with an algorithm that minimizes blocking.

DETAILED DESCRIPTION OF THE PREFERRED EMBODIMENTS

Figure 2:
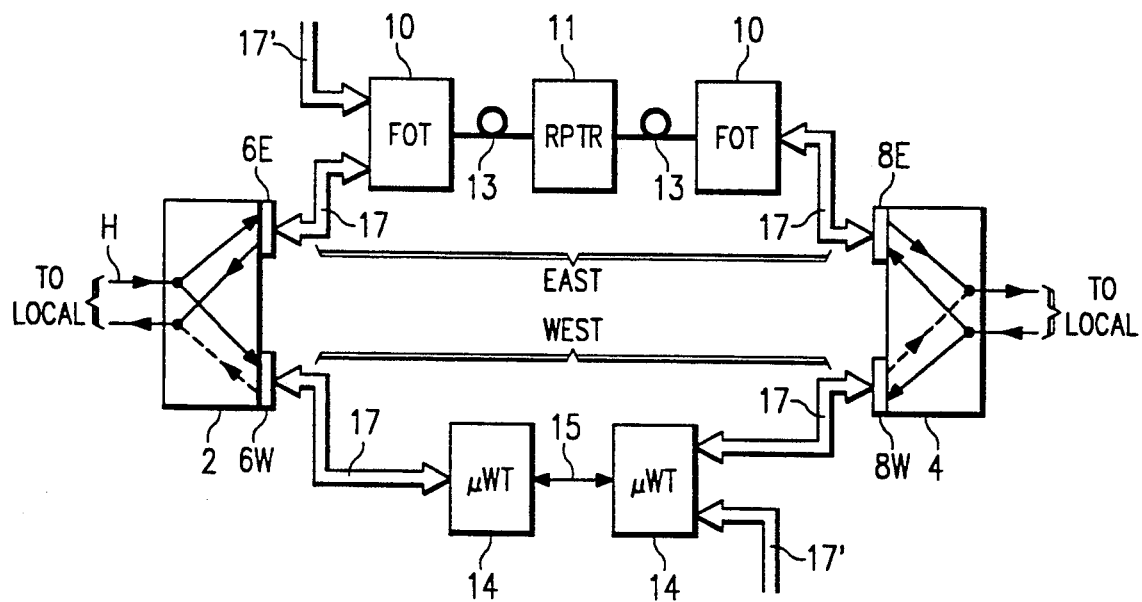
FIG. 2 is an electrical diagram, in block form, of a telecommunications system in which the preferred embodiments of the invention may be used.

Referring first to FIG. 2, an example of a digital telecommunications system into which the preferred embodiments of the invention are implemented will be described. It is to be understood that the system of FIG. 2 is presented by way of example only, and that the present invention may be incorporated into other system configurations, and provide the same level and importance of benefits and advantages as provided in the system of FIG. 2.

The system of FIG. 2 is a long-distance telecommunications system, in which digital cross-connects 2 and 4 bidirectionally communicate with one another over a distance that may be on the order of hundreds of miles. Digital cross-connects 2, 4 are of conventional construction, and are preferably 1633 SX digital cross-connects manufactured and sold by Alcatel Network Systems, Inc. While FIG. 2 illustrates single ports in each of cross-connects 2, 4 in redundant communication with one another, it is of course well understood that each of cross-connects 2, 4 support many ports, for example up to on the order of 2048 ports. The ports served by cross-connects 2, 4 may be in communication with one another in the same manner as that shown in FIG. 2, or may communicate with other lines to other cross-connects in the overall telecommunications system within which cross-connects 2, 4 are installed.

In the exemplary system of FIG. 2, digital cross-connects 2, 4 communicate with one another along redundant routes in a bidirectional manner. A first bidirectional route (EAST) is between I/O port 6E of cross-connect 2 and I/O port 8E of cross-connect 4, and includes DS-3 lines 17 connected to each of ports 6E, 8E. The EAST route also includes fiber optic terminals (FOTs) 10, having fiber optic cable 13 connected therebetween; repeater 11 is provided within fiber optic cable 13 in the conventional manner. FOTs 10 may be of conventional construction, such as described hereinabove relative to FIG. 1, except that the present invention allows elimination of the 1:1 redundancy line protection function. As is well known, modern fiber optic cable is able to communicate data at a capacity far exceeding a single DS-3 line; accordingly, multiple DS-3 lines 17 may be received by each FOT 10, for communication along fiber optic cable 13 in time-division multiplexed fashion.

The second route (WEST) in the system of FIG. 2 is between ports 6W and 8W of cross-connects 2, 4, respectively. In this example, the WEST route includes microwave terminals 14 that receive DS-3 lines from cross-connects 2, 4, with microwave transmission line 15 connected therebetween. As such, the present invention may be used with transmission media of different types, so that microwave transmission can provide redundancy to fiber optic cabling; of course, the redundant routes may both be fiber optic, microwave or any other conventional medium.

The exemplary system of FIG. 2 is an "open" system, in that communication is not limited to traffic only between cross-connects 2, 4. For example, DS-3 lines 17' may be received by FOTs 10 and microwave terminals 14 from digital cross-connects or other sources in the system, as shown in FIG. 2. In addition, other conventional network elements, such as add/drop boxes and the like, may of course also be resident in the system of FIG. 2.

The ports of digital cross-connects 2, 4 on the opposing sides from the EAST and WEST routes are connected to local systems, in the conventional manner; these ports are referred to in the art, and hereinbelow, as the "head" ports. Such connection may be by way of DS-3 lines or other conventional communication channels.

As illustrated in FIG. 2, transmission is effected by each of cross-connects 2, 4 from its head port to both the EAST and WEST ports, effecting a "head-end bridge" as is well known in the art. Each of cross-connects 2, 4 receive communication from only one of its EAST and WEST ports at any given time, however. In the example of FIG. 2, communication is received by cross-connects 2, 4 from its EAST ports 6E, 8E, respectively; the WEST route is the secondary route in this example. The present invention performs blind receive-end switching within cross-connects 2, 4 in the event of a monitored hard or soft path fault or error condition, as will be described in further detail hereinbelow.

Figure 3:
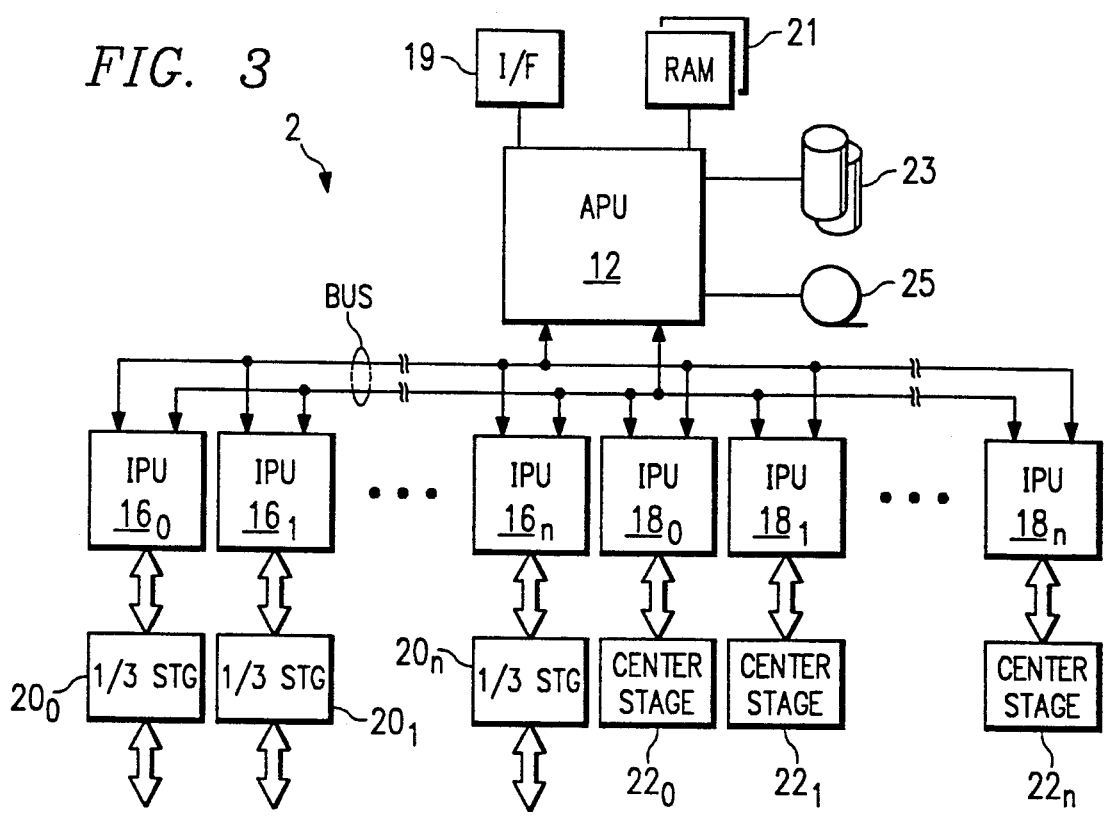
FIG. 3 is an electrical diagram, in block form, of a digital cross-connect system in which the preferred embodiments of the invention may be implemented.

Referring now to FIG. 3, the construction of cross-connect 2 according to the preferred embodiments of the invention will now be described (cross-connect 4 is preferably similarly constructed). As noted above, the preferred construction of cross-connect 2 is in such a manner that the computing and switching processing capability is widely distributed, as in the 1633 SX cross-connect system manufactured and sold by Alcatel Network Systems, Inc. The construction of cross-connect 2 shown in FIG. 3 thus corresponds to the 1633 SX cross-connect system.

Cross-connect 2 includes administrative processing unit (APU) 12 which is the central data processor within the system. APU 12 is directly connected to conventional storage and input/output functions such as random access memory 21, disk storage 23, tape drive 25, and user interface 19. APU 12 is also connected to bus BUS, which may include one or more information paths within the system. The function of APU 12 is to administer the operation of cross-connect 2 at a relatively high level, and to provide user control and visibility relative to the switching operations provided by cross-connect 2.

Cross-connect 2 further includes many distributed processors connected to bus BUS, illustrated in FIG. 3 as interface processing units (IPUs) 16, 18. Each of IPUs 16, 18 is a relatively complex data processing unit, including a conventional programmable microprocessor, or alternatively custom logic, of adequate complexity and performance to perform the functions described hereinbelow. Each of IPUs 16 are for controlling input and output functions relative to the bidirectional DS-3 ports, and thus control the operation of the head, east and west ports of cross-connect 2 when installed into a system as illustrated in FIG. 2. To accomplish this function, each of IPUs 16 is associated with and bidirectionally coupled to one of first/third matrix stage units 20. In this example, each of first/third stages 20 includes a portion of the switching matrix (as will be described hereinbelow), and the appropriate transceiver circuitry to provide four DS-3 ports.

Cross-connect 2, for these embodiments of the invention, serves as a digital telecommunications switch in a manner realized according to a modified version of the well-known Clos matrix. A preferred version of the modified Clos matrix useful in cross-connect 2 is described in copending application Ser. No. 882,920, filed May 14, 1992 in the name of E. K. Bowden, entitled "Methods and System for Immediately Connecting and Reswitching Digital Cross-connect Networks", assigned to Alcatel Network Systems, Inc. and incorporated herein by this reference. According to this matrix realization, switching of a head port to east and west ports is accomplished by way of a three-stage matrix, with the head port coupled to a third stage, and the east and west ports to a first stage. The switching operation is accomplished via a selected center matrix stage which is coupled to the third stage and the desired first stage(s).

According to this example of cross-connect 2, IPUs 18 are each coupled to bus BUS and to an associated center matrix stage 22. Accordingly, IPUs 16, 18 control the switching operation in a distributed fashion (i.e., without requiring intervention from APU 12), by placing the appropriate first matrix stage in one of first/third stages 20 in communication with a selected center stage 22, which is in turn placed in communication with a third matrix stage in one of first/third stages 20. Each of first/third stages 20 and center stages 22 are preferably implemented as individual application specific integrated circuits (commonly referred to as ASICs), controlled by and in communication with its associated IPU 16, 18, respectively.

As is well known in the art, the term "path" refers to a digital data channel that is communicated in a time-division multiplexed fashion along a "line"; as such, a "line" includes many paths, as well as framing and other information concerning line status, synchronization, and the like. Also as is well known in the art, the term "facility" refers to path data as it is received by a switch or cross-connect. As will be apparent from the description herein, the present invention is intended to provide facility protection for telecommunication, in that individual facilities are monitored and switched, so that redundancy is provided for individual paths, without requiring switching and redundancy for entire lines. Of course, the present invention is also capable of protecting against line failures.

The operation of cross-connects 2, 4 in providing the facility protection will now be described in detail relative to the preferred embodiments of the invention. It should be realized that a system including a single one of cross-connects 2, 4 having the facility protection schemes described hereinbelow, with conventional cross-connects, switching systems and the like in the remainder of the network, may also take advantage of the present invention. As such, a customer desiring the high speed facility protection provided by the present invention may implement the same on his receiving cross-connect, without regard to the type of switches that are elsewhere in the system, so long as each facility to be protected is also received at a redundant port.

Zero Blocking Fast Facility Protection

Figure 4A:
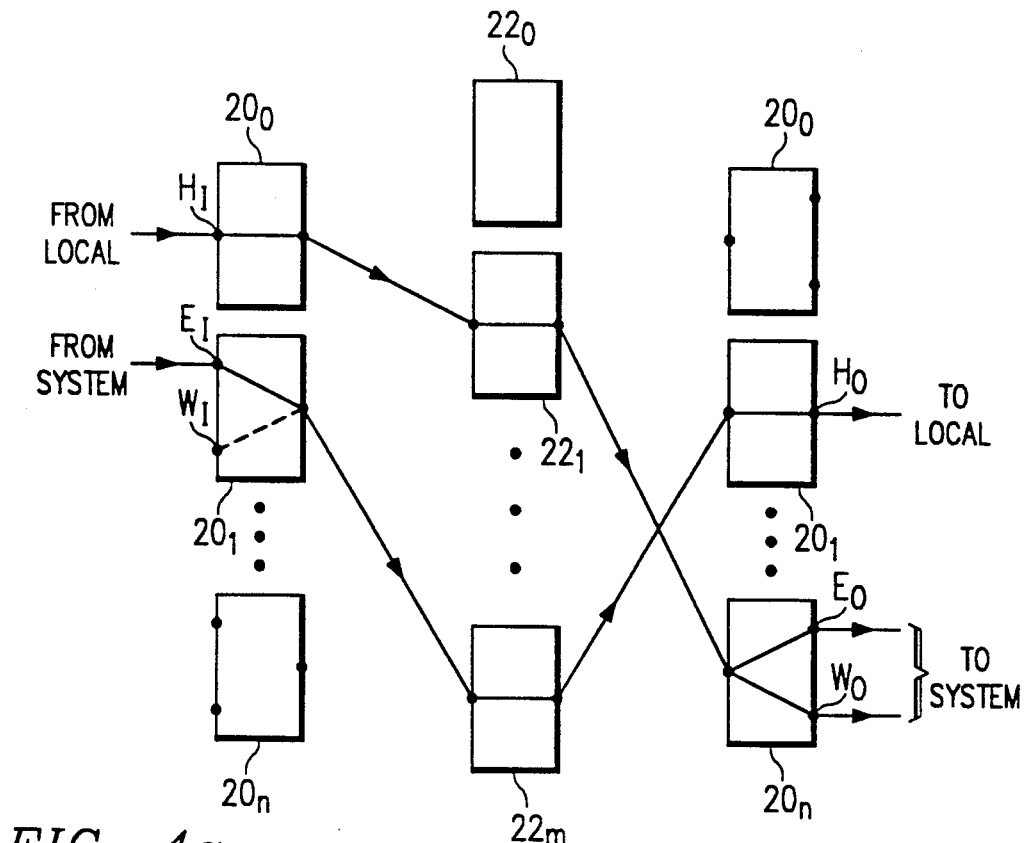
FIGS. 4a and 4b are matrix diagrams of a digital cross-connect, illustrating the operation of a first preferred embodiment of the invention.
Figure 4B:
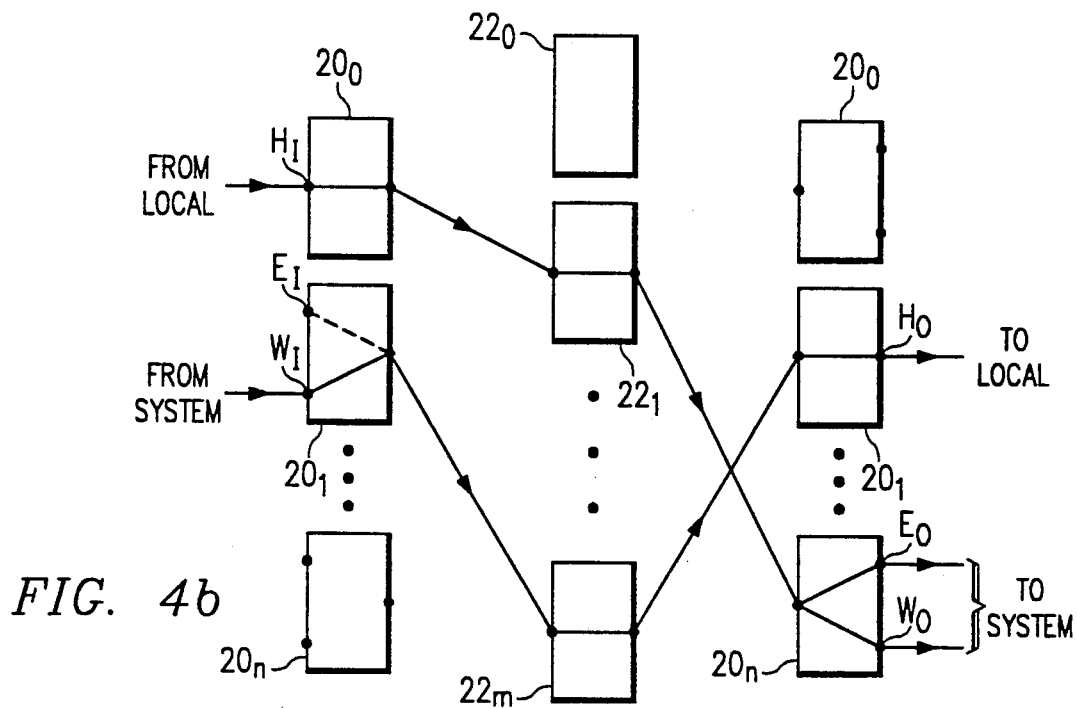
Figure 5:
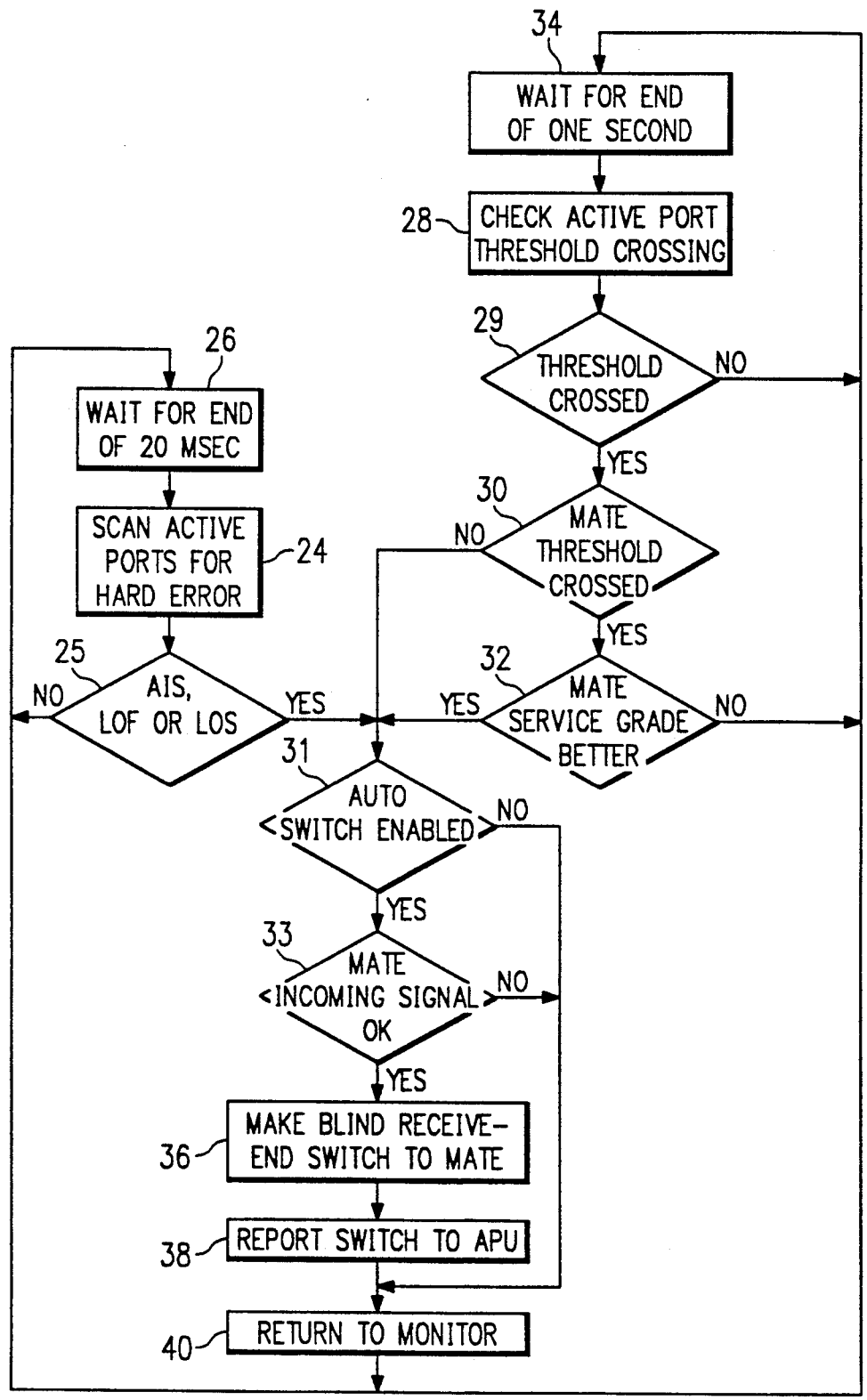
FIG. 5 is a flow chart illustrating the operation of the first preferred embodiment of the invention.

Referring to FIGS. 4a, 4b, and 5, the operation of digital cross-connect 2 in providing facility protection according to a first embodiment of the invention will now be described in detail. The method is preferably implemented in a computer program according to which APU 12 and IPUs 16, 18 operate. It is contemplated that one of ordinary skill in the art will be able to readily implement the method described hereinbelow into a digital cross-connect without undue experimentation, based on the following description.

FIG. 4a illustrates, in matrix form, the switch routing in cross-connect 2 with the EAST route as primary for the example of a single bidirectional path. On the transmission side, the path is received from the local side of cross-connect 2 by input head port $H_j$ of first/third stage $20_0$ (serving as the first stage of the Clos matrix for data from local to system), and is communicated through center stage $22_1$ to first/third stage $20_n$. First/third stage $20_n$ serves as the third stage of the Clos matrix for data transmitted from local to system, and in this embodiment of the invention broadcasts to both east and west output ports $E_O$ and $W_O$ for transmission of the path associated with input head port $H_I$. According to this embodiment of the invention, both east and west output ports $E_O$, $W_O$ for a given path are controlled by the same first/third matrix stage $20_n$ (and, in this example, by the same ASIC), in order to avoid a blocking condition because of the broadcast.

Accordingly, the path data received from the local side at input head port $H_I$ is switched to, and broadcast from, both east and west output ports $E_O$, $W_O$ at all times. This third-stage broadcast enables the blind receive end switching used in the facility protection scheme according to the present invention.

On the receive side for this path, first/third stage $20_1$ receives a facility from the system at active east input port $E_I$ (the WEST route being the secondary route in the system at this time). The facility is routed via center stage $22_m$ back to first/third stage $20_1$, and presented to output head port $H_O$. It should be noted that, in this example, output head port $H_O$ is on the same first/third stage $20_1$ as east and west input ports $E_I$, $W_I$, as each first/third stage 20 can serve multiple ports (whether head, east or west ports); however, according to this embodiment of the invention, the output head port $H_O$ may be on a different first/third stage 20 from that of the east and west input ports $E_I$, $W_I$ with which it is associated. According to this embodiment of the invention, first/third stage $20_1$ is operable to switch the facility from being received from east input port $E_I$ to being received from west input port $W_I$, upon the occurrence of a hard or soft failure event as will be described hereinbelow.

Of course, while FIG. 4a illustrates a single bidirectional path through cross-connect 2, similar switching and connection is made through cross-connect 2 for each of the active paths and ports that it is serving. In the example of the 1633 SX cross-connect, up to 2048 ports and paths are handled in parallel.

FIG. 5 is a flow chart illustrating the operation of the facility protection monitoring and switching functions performed by cross-connect-2 according to this first embodiment of the invention. The functions illustrated in FIG. 5 and described hereinbelow are performed by each IPU 16 for facilities received at its ports from the system, i.e., for data received at the east and west input ports $E_I$, $W_I$ of its associated first/third stage 20. Accordingly, each IPU 16 is able to monitor the facilities received at the input ports in its associated first/third stage 20, and to enable the switching necessary to provide protection.

According to this embodiment of the invention, both hard and soft errors or failure conditions may enable protection switching to the secondary redundant input port. Referring to FIG. 5, the monitoring for hard errors is performed beginning with process 24, in which each of the active ports $E_I$, $W_I$ associated with an IPU 16 is scanned to determine if a hard error signal or condition has been received. The scanning performed by process 24 is performed of the portion of first/third stage $20_1$ (in the case of input ports $E_I$, $W_I$) at which the signal is received. In this example of the invention, the hard error conditions upon which switching may be enabled are as follows:

AIS: Alarm indication signal
LOS: Loss of signal
LOF: Loss of frame

LOS and LOF signals are well known path and line data signals by which loss of a facility is detected. As is well known in the art, the AIS signal is generated by a network element upon its detecting of an alarm condition from an "upstream" network element; this causes only a single alarm signal to be generated to facilitate corrective action, as the location of the fault can be more readily detected than if each network element passed along an alarm signal. Decision 25 determines if any one of the hard error signals is detected by the scan of process 24; if so, control passes to decision 31 to effect facility protection switching as will be described below. If no hard error is detected in decision 25, wait state 26 is entered for the particular path, until the designated period (e.g., 20 msec) elapses, at which time the scan of process 24 is initiated again. The frequency at which the scan of the active ports is performed depends primarily on the switching time to be guaranteed in the event of a hard fault. For example, if facility protection is to be effected in a short time, the scan period must be kept sufficiently short so that the sum of the scan period plus the time required to switch is less than the specified switching time. In this example, where the switching time specification is 50 msec (maximum), a scan period of 20 msec allows up to 30 msec to effect facility protection in response to a hard failure.

Soft error conditions are also monitored by each IPU 16 at its associated active input ports in process 26, but at a less frequent rate. The soft error conditions, as will be described hereinbelow, relate to measured errored seconds over a period of time, and as such the same urgency is not present for detection of a soft error threshold crossing as in the case of a hard error state. The table hereinbelow provides an example of the soft error thresholds upon which facility protection switching may be enabled:

10 errored seconds (ES) in 15 minutes; or
864 ES in 1 hour; or
4 severely errored seconds (SES) in 24 hours where an ES is defined as any second within which a coding violation is detected, and where an SES is defined as any second in which more than 44 coding violations are detected i.e., an error rate of greater than $10^{-6}$ errors per second).

It should be noted that the soft error thresholds checked in process 28 according to this embodiment of the invention differ in type and in degree from conventional performance monitoring thresholds. Firstly, the threshold error rates at which facility protection switching is to be initiated will generally differ from those of conventional performance monitoring (by which the grade of service is defined), and will generally be at more stringent levels so that facility switching may be used to avoid degradation in the grade of service for the facility. In addition, the threshold error rates that initiate facility protection switching are administrable, allowing the system operator to increase or decrease the sensitivity of facility protection switching by adjusting the threshold values via APU 12. Secondly, as hard error conditions (LOS, LOF, AIS) are monitored for facility protection separately from soft error threshold crossings, the threshold definitions in the above table are purely for errored seconds due to coding violations, and do not include errored seconds due to the presence of LOS or AIS conditions (which are included in the conventional errored seconds definitions).

Referring back to FIG. 5, process 28 and decision 29 are performed by IPU 16 at each of its active input ports in first/third stage 20 (such as east input port $E_I$) to determine if one of the soft error threshold conditions have been exceeded. The monitoring point is at the input port to ensure that only error conditions in the facility, and not errors due to the matrix, are used to effect the protection switching. If no soft error threshold condition has been exceeded, wait state 34 is entered until the desired period (e.g., one second) elapses before the next threshold crossing detection operation is performed.

If a soft error threshold crossing is detected in decision 29, the method according to this embodiment of the invention performs additional decisions to ensure that if the facility is switched, the result will not be worse than that causing the switch. IPU 16 first determines, in decision 30, if the "mate" port (i.e., the opposite east or west port from that checked in process 28) has recently crossed any soft error thresholds during the time it was most recently active. This determination is performed by IPU 16 based on information from its constant monitoring of the mate port which continues even for inactive ports, and thus, according to this embodiment of the invention, APU 12 need not intervene in the switching process. If not, control passes to decision 31 to effect the switching. If thresholds have been crossed for the mate port, IPU 16 analyzes the history of the mate port to determine if its grade of service is higher than that checked; if so, switching is again enabled. If the grade of service at the mate port is not better, control passes back to wait state 34; no facility switching is effected in this event, as the switch to the mate port would not improve the error rate of the facility.

It should be noted that the threshold crossing check for mate ports as performed by decisions 30, 32 is not performed if a hard failure (LOS, LOF, AIS) is detected. This is because an errored facility is preferred over a hard failed channel; as such, the error rate status of the mate channel is immaterial in the event of a hard failure, as the switch is to be made regardless of the error rate.

Upon entry to the switching portion of the method, whether due to a hard error (from decision 25) or a soft error rate threshold crossing (from decisions 29, 30, 32), IPU 16 first determines, in decision 31, whether the automatic switching function is enabled. If not, the system returns to the monitoring state (via process 40), in which the scan and checks of processes 24, 28 are again periodically performed. To avoid oscillation, it is preferred that each IPU 16 monitor the switching frequency for each facility it receives, and disable automatic switching for a facility upon detecting excessive switching frequency (e.g., greater than four switches in ten minutes). Re-enabling of the automatic switching may be effected either manually or automatically at the end of a defined period (e.g., at the end of a 24 hour period).

As shown in FIGS. 2 and 4a, according to this embodiment of the invention, each facility is broadcast on both the EAST and WEST ports at all times. Accordingly, at this stage of the switching process (when enabled), decision 33 is performed by which the incoming facility on the mate port is checked by IPU 16 to ensure that the facility received thereat is operable; if not, the system returns to the monitoring state via process 40. The check performed by decision 33 on the mate port (in the example of FIG. 4a, port $W_I$ of first/third stage $20_1$) is accomplished by monitoring the facility received thereat over a period of time, such as on the order of 10 msec, to ensure that no hard failure is present. If the mate port incoming facility is in service, process 36 is then performed to effect a blind receive-end switch.

Referring next to FIG. 4b, the matrix condition of cross-connect 2 according to this example is illustrated after the blind switch of process 36. FIG. 4b illustrates that first/third stage $20_1$ is now receiving the facility on west input port $W_I$ from the system, and routing the facility through center stage $22_m$ to head output port H $_O$ of first/third stage $20_1$. Accordingly, referring back to FIG. 2, cross-connect 2 is now receiving the facility from cross-connect 4 via the WEST (microwave) route, which is the secondary route to the EAST (fiber optic) route.

Upon completion of the switching of process 36, IPU 16 notifies APU 12 of the switch (process 38), so that the switching event is visible to the system operator via the supervisory functions and interface of APU 12. In addition to notification of the switching event and the ports affected, IPU 16 may also communicate such information as the cause of the switch (i.e., hard or soft error). The system then returns to the monitor state via process 40, and the process of FIG. 5 is repeated periodically for the facility now being received via the WEST route.

It is well known in the art that facility failures are often due to line cuts, such as occur if a fiber optic cable is cut during building construction and other activities. Such a line cut will, of course, appear to cross-connects 2, 4 as a LOS or AIS condition (depending upon the location of the cut) for all of those facilities communicated by the cut line. The switching of each facility carried by the cut line may be effected in an individual manner by way of the process of FIG. 5. However, once a line cut is detected, switching time may be greatly reduced by avoiding much of the decision time, and especially the mate port check of decision 33 which requires a 10 msec monitoring period.

The multiple switching of those facilities associated with a cut line, is preferably performed upon the IPU 16 detecting the first signal failure resulting from a cut line completing the 10 msec mate port monitoring period described above. Upon completion of this monitoring step, this IPU 16 checks all of the ports under its control to determine which, if any, are active east or west ports for a facility. IPU 16 will then execute the process of FIG. 5 to check for hard failures for each of its ports which is an active east or west port, prior to relinquishing control, and without the 20 msec scan wait time (process 46) between examination of the incoming facilities at these ports. The overall switching time of the multiple facilities affected by a line failure, such as a line cut, is thus greatly reduced.

It is of course evident from the foregoing description that the facility protection switching scheme of this embodiment of the invention is unidirectional, as it performs a receive-end switch upon detection of a failure event. As noted above relative to line cuts, many facility failures are due to events that affect transmission in both directions (the obvious example being a line cut). Those other cross-connects in the system (such as cross-connect 4) that have the facility protection capability described hereinabove will simultaneously be performing the same monitoring and facility protection switching as that of cross-connect 2. Accordingly, the unidirectional facility protection switching performed according to this embodiment of the invention will be performed in a bidirectional manner (i.e., by both ends of the line switching unidirectionally) if both cross-connects 2, 4 are configured to do so.

It is also evident that this embodiment of the invention provides facility protection switching in a "blind" manner, in that no communication with the other end of the system is required in order to effect the switch. This blind switching thus provides fast and reliable facility protection. In addition, the distributed nature of the monitoring and switching functions, as performed locally by IPUs 16 rather than manually responsive to a central processor, allows for facility protection to be performed in a very rapid manner, such as on the order of less than 50 msec from the time of a hard error fault. As such, the present invention provides a high degree of protection for the customer, particularly those demanding a high grade of service. Finally, as the protection scheme is performed on a facility level, rather than a line level, facility protection in the event of excessive error rates is available by way of the present invention.

Figure 1:
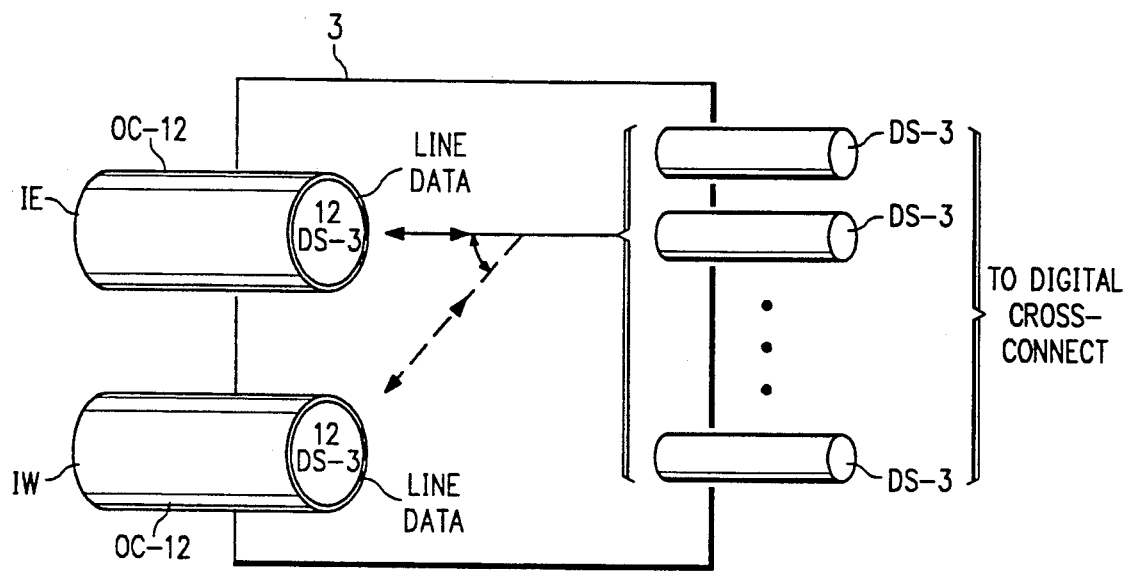
FIG. 1 is an illustration of the bandwidth, line and path data communicated in a conventional fiber optic terminal.

Furthermore, the embodiment of the invention described hereinabove relative to FIGS. 4a, 4b and 5 provides facility protection switching in a manner that is guaranteed to be non-blocking, since the broadcast to the redundant ports is performed in the third matrix stage (see first/third stage $20_n$ of FIG. 4a), and since the receive-end switch is performed in the first stage. This requires that the east and west input ports for a given path must be physically within the same input/output "bay", i.e., controlled by the same IPU 16; similarly, the east and west output ports for a given path must also be physically located within the same input/output bay. This construction is not only non-blocking, but also is easily implementable; in this example, with the east and west input ports $E_I$ and $W_I$ in the same ASIC, a single write operation by the associated IPU 16 effects the receive-end switch.

Where the system includes fiber optic lines, the present invention also replaces the 1:1 line protection of conventional FOTs (see FIG. 1 above). The redundant fiber optic line is thus available to carry traffic, or alternatively need not be implemented at all. In addition, non-fiber optic lines may now be used as redundant secondary routes for fiber optic lines. Fiber optic utilization is thus greatly improved by way of the present invention, when implemented in fiber optic transmission networks.

Flexible Port Assignment Fast Facility Protection

A second preferred embodiment of the present invention will now be described, in which the constraint on assignment of the east and west ports present in the first preferred embodiment of the invention is overcome. This second embodiment of the invention adds additional benefits to those provided by the first embodiment, especially in enabling implementation of the facility protection switching scheme into existing systems that do not have the east and west ports for a path assigned to the same input/output bay. This embodiment of the invention is additionally advantageous as it allows for flexibility in assignment and rearrangement of ports in newly installed systems.

As in the case of the first preferred embodiment, the method according to the second preferred embodiment of the invention is preferably implemented in a computer program according to which APU 12 and IPUs 16, 18 operate. It is contemplated that one of ordinary skill in the art will be able to readily implement the method described hereinbelow into a digital cross-connect without undue experimentation, based on the following description.

Figure 6A:
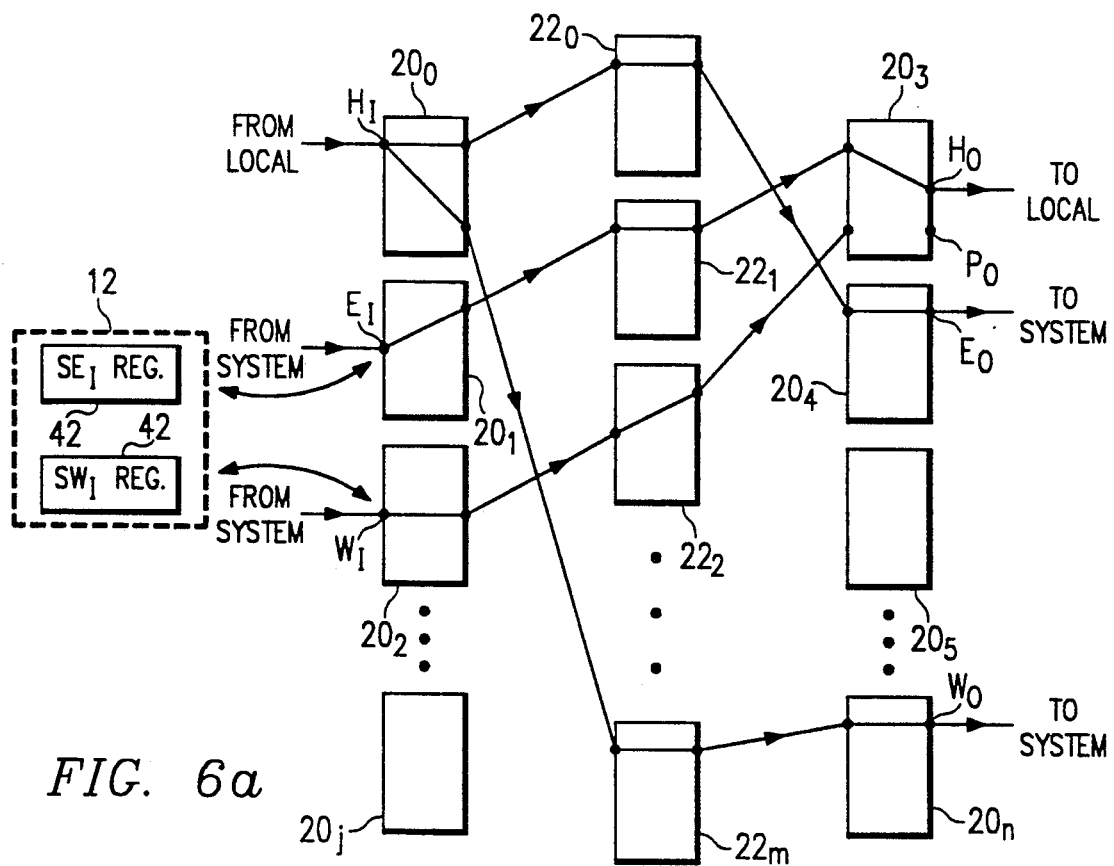
FIGS. 6a through 6c are matrix diagrams of a digital cross-connect, illustrating the operation of a second preferred embodiment of the invention.

FIG. 6a is a matrix diagram illustrating the state of cross-connect 2 for the example of a single path at the beginning of the method according to this second embodiment of the invention. As noted above, according to this embodiment of the invention, the east and west input ports $E_I$, $W_I$ for this single path need not be assigned to the same first/third stage 20, and thus need not be physically located near each other or in the same input/output "bay" as in the first embodiment of the invention described hereinabove; similarly, the east and west output ports $E_O$, $W_O$ similarly are not constrained to the same first/third stage 20. Accordingly, the present invention is especially useful as it may be implemented in existing installations of digital cross-connects.

As illustrated in FIG. 6a, the input transmission from the local side of cross-connect 2 for this path is received at head input port $H_I$. In this example, east output port $E_O$ is on a different first/third stage 20 from west output port $W_O$ ($20_4$ and $20_n$, respectively). As such, the broadcast of the transmission from head input port $H_I$ to east output port $E_O$ and west output port $W_O$ cannot necessarily be made at the third stage of the matrix, but instead may have to be made at one of the center stages 22, or in the worst case (as shown in FIG. 6a) at the first matrix stage $20_O$ at the location of head input port $H_I$.

It is well known in the art that broadcast transmission is preferably made at the latest possible stage of the Clos matrix for the desired output ports, in order to minimize the possibility of a blocking condition for subsequently assigned ports. It is therefore preferred that the broadcast of the transmission from head input port $H_I$ to east and west output ports $E_O$, $W_O$ be done in a manner which minimizes the frequency of first or second matrix stage broadcasts. Such a method would first determine if a third stage broadcast is available, and would make a second stage broadcast only if no third stage broadcast would be sufficient; only if neither a third nor a second stage broadcast would be sufficient would a first stage broadcast be used.

It should also be noted, however, that the east and west routes are assigned and reserved as the system is set up according to this embodiment of the invention. As a result, the only time at which blocking could be encountered is at such time as new ports are added and their cross-connect matrix route assigned. In the event that implementation of a new port results in a blocking situation, the matrix routes can be readily reallocated during system configuration to remove the blocking condition.

Furthermore, the probability of blocking is relatively low even for relatively large numbers of ports in the cross-connect. By way of computer modeling, it has been calculated that the blocking probability in a 2048 port cross-connect, having 2n center stages (as described in the above-cited copending application Ser. No. 882,920, filed May 14, 1992 in the name of E. K. Bowden, entitled "Methods and System for Immediately Connecting and Reswitching Digital Cross-connect Networks", assigned to Alcatel Network Systems, Inc. and incorporated herein by reference) is essentially zero where 70% or fewer of the available ports are utilized and where 33% of the east/west port pairs are not assigned within the same four-port logical group (i.e., to the same first/third stage 20), even where 75% of the utilized ports are implemented with the facility protection described herein. With 90% port utilization and 75% of the utilized ports having facility protection implemented, the blocking probability has been calculated to be less than 0.004%. Accordingly, this embodiment of the invention will provide great flexibility of implementation, while only adding an extremely small likelihood of blocking even for large and busy cross-connects.

On the receive side of the bidirectional path in the example of FIG. 6a, the initially active route is the EAST route. East input port $E_I$ is implemented in first/third stage $20_1$, and its transmission is routed through center stage $22_1$ and first/third stage $20_3$ to head output port $H_O$. As before, head output port $H_O$ communicates the transmission to the local side of cross-connect 2.

In this example, the secondary inactive west input port $W_O$ is implemented at first/third stage $20_2$, and thus in a different first/third stage 20 than that of east input port $E_O$. West input port $W_I$ is connected via center stage $22_2$ also to first/third stage $20_3$, but since west input port $W_I$ is the secondary port at this time, no connection is made within the third matrix stage in first/third stage $20_3$.

As noted above, each of first/third stages 20 may support multiple ports, for example, four ports. In this example, one of the spare ports in first/third stage $20_3$ serves as protection output port $P_O$. Protection port $P_O$ is not necessarily able to communicate traffic, but for purposes of this embodiment of the invention is able to be monitored by IPU 16, in the manner to be described hereinbelow.

Also according to this embodiment of the invention, APU 12 includes a status register 42 for each of east and west input ports $E_I$, $W_I$. These status registers 42 contain certain information gathered by the appropriate IPUs 16 for the associated ports, including whether the most recent use of the port resulted in a hard error condition or if the port is available for successful receipt of a facility.

Figure 7:
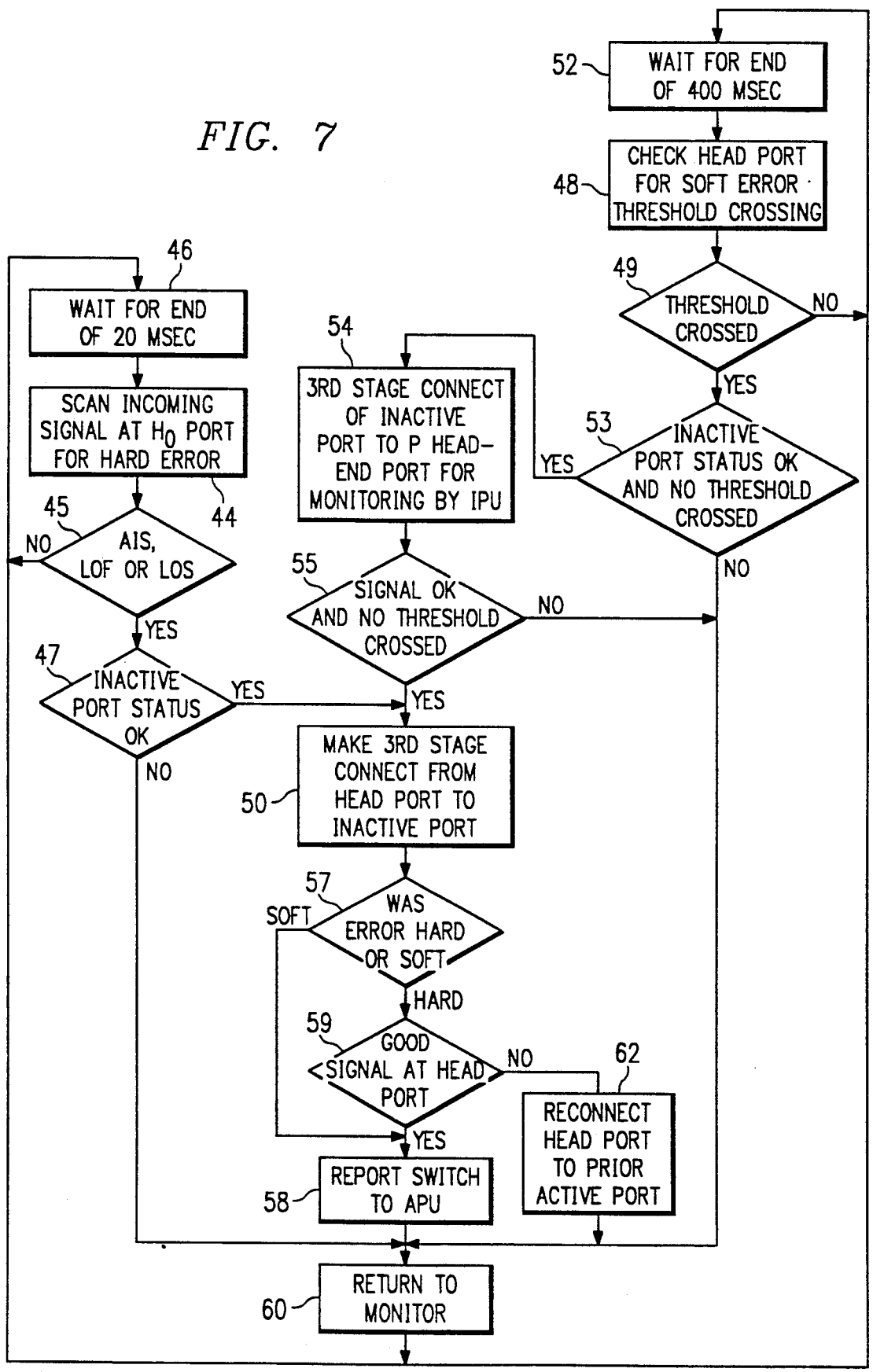
FIG. 7 is a flow chart illustrating the operation of the second preferred embodiment of the invention.

As shown in FIG. 7, the method according to this embodiment of the invention includes multiple scanning and checking operations to detect hard and soft error conditions in the received facility. In contrast to the first preferred embodiment of the invention, the monitoring and switching function of this embodiment of the invention is performed at the third stage at which head output port $H_O$ is implemented, as this is the only first/third stage 20 within which it is guaranteed that traffic from both east and west input ports $E_I$, $W_I$ will meet.

For the example of the single path in the condition shown in FIG. 6a, process 44 is performed by which IPU 16 associated with first/third stage $20_3$ scans incoming traffic at head output port $H_O$ for hard error conditions, namely the AIS signal noted hereinabove (since any incoming LOF or LOS signal is converted to AIS prior to communication in the matrix), and also any high-speed loss-of-frame condition caused by the matrix itself. Decision 45 is then performed to determine if a hard error condition has been detected; if not, wait state 46 is entered and control remains there until the desired scan period (e.g., 20 msec) elapses, at which time the scan of process 44 is repeated at the head output port $H_O$.

If a hard error condition is detected in process 44 and decision 45, decision 47 is performed in which status register 42 assigned to the inactive port for the path (in this example, the $SW_I$ register 42 for west input port $W_I$) is interrogated to determine whether the inactive port is in an error state. If the status register 42 indicates an error state for the inactive port, the facility protection switch will be fruitless, and accordingly control passes back to the monitor condition (process 60). If the status register 42 interrogated in decision 47 indicates that the inactive port is not in an error condition, control passes to process 50 to make the facility switch.

Process 50 effects the facility switch at the head output port $H_O$ end of the path, which in this case is performed by first/third stage $20_3$. As in the first embodiment of the invention, the switch is effected in this example of cross-connect 2 by the associated IPU 16 performing a write operation to the ASIC within which first/third stage $20_3$ is realized. After completion of the head-end switch of process 50, the condition of the matrix is in the state illustrated in FIG. 6b, with traffic from west input port $W_I$ routed via first/third stage $20_2$ through center stage $22_2$ to head output port $H_O$ via first/third stage $20_3$. Traffic from the east input port $E_I$ is disconnected from head output port He at first/third stage $20_3$.

After the head-end switch is effected by process 50 responsive to the hard error condition, decision 57 passes control to decision 59 in which the signal at head output port $H_O$ is checked, in this example, to ensure that the facility now being received at west input port $W_I$ is valid. If not, process 62 is performed which reconnects head output port He to the prior active input port $E_I$, with control passing back to the monitored state. If the facility received at the previously inactive port (e.g., west input port $W_I$) is valid, decision 59 passes control to process 58 in which the event of the switch is reported to APU 12, together with information identifying the path for which the switch was made and also the reason for the facility protection switch. Included in the reporting of process 58 is the updating of status register 42 for the previously active port, indicating that the most recent use of the port had an errored condition; in addition, the status register for the newly active port is also updated to indicate that it is in a good condition. Control then passes back into the monitor state (process 60), for the newly active port.

Referring still to FIG. 7, the monitoring and facility protection switch for the case of soft error rate threshold crossings will now be described. As in the case of the first embodiment of the invention described hereinabove, the soft error rate monitoring is performed in an interleaved fashion with the hard error scanning, but at a reduced frequency. Accordingly, over a given period of time, each path will be monitored for both hard error events and also for soft error rate excesses.

According to this embodiment of the invention, soft error threshold crossings are monitored at the first stage; in this example, first/third stage $20_1$ is monitored for coding violations received at east input port $E_I$, and first/third stage $20_2$ is monitored for coding violations at west input port $W_I$. IPUs 16 associated with these ports thus determine whether a soft error rate threshold is crossed, on an ongoing basis. The soft error rate thresholds checked are preferably similar to those discussed above relative to the first embodiment of the invention, namely errored seconds and severely errored seconds due purely to coding violations (i.e., not including seconds having LOF, LOS or AIS conditions) over varying periods of time; as in the first embodiment described above, the particular thresholds may be administrated to those values desired for the grade of service.

The monitoring of soft error threshold crossings at the receive end (first matrix stage) is used to periodically update status registers 42 both for active and also inactive ports. As will be noted below, this information is used in the facility switching for error rate reasons.

In the event that a soft error threshold is crossed for a facility, its IPU 16 inserts a flag to this effect in the overhead data for the facility, prior to transmitting the facility along to its center stage 22. Process 48 checks head output port $H_O$ to determine if the overhead bits in the facility it receives indicates that a soft error rate threshold has been crossed from the active input port (in this example, east input port $E_I$). Decision 49 is then performed based on the results of the check of process 48. If no soft error threshold has been exceeded for the path, control passes to wait state 52 for the remainder of the check period (e.g., 400 msec). If a soft error threshold has been exceeded, decision 53 is performed by which the status register 42 of the inactive port is interrogated, similarly as in decision 47 for hard errors. In addition, decision 53 also interrogates the status register 42 to determine if a soft error threshold has recently been exceeded for the inactive port, to prevent switching to a port which also has an active threshold crossing; if either is the case, no switching is performed and control passes back to the monitor state of process 60.

Figure 6B:
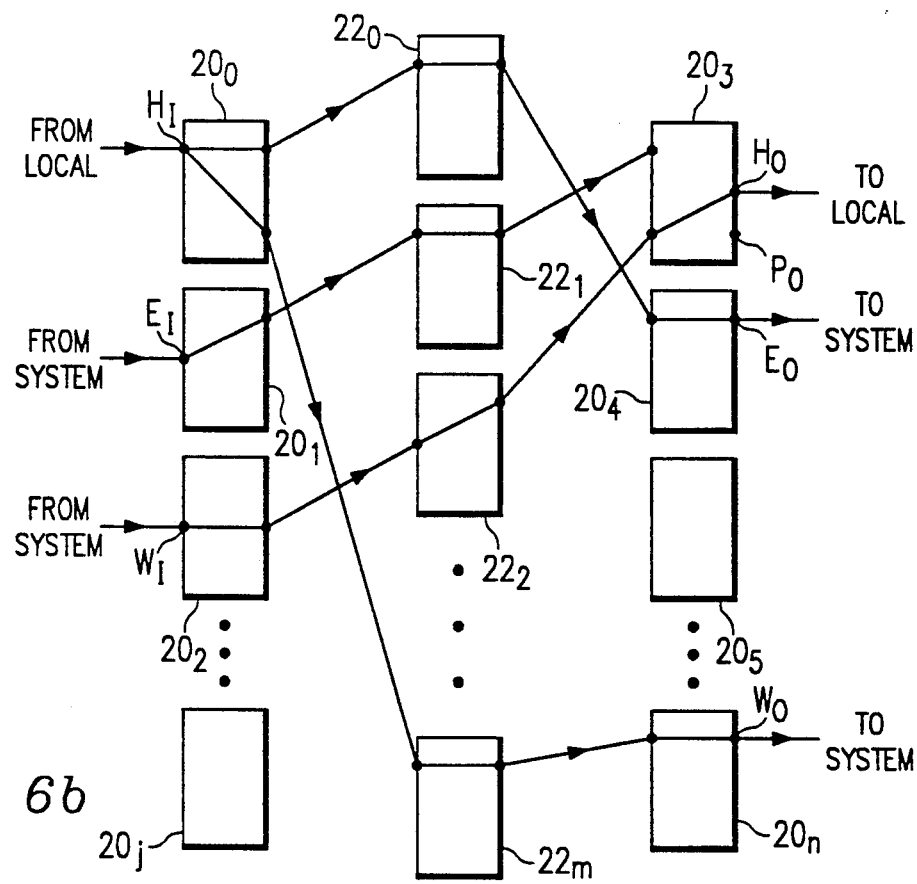
Figure 6C:
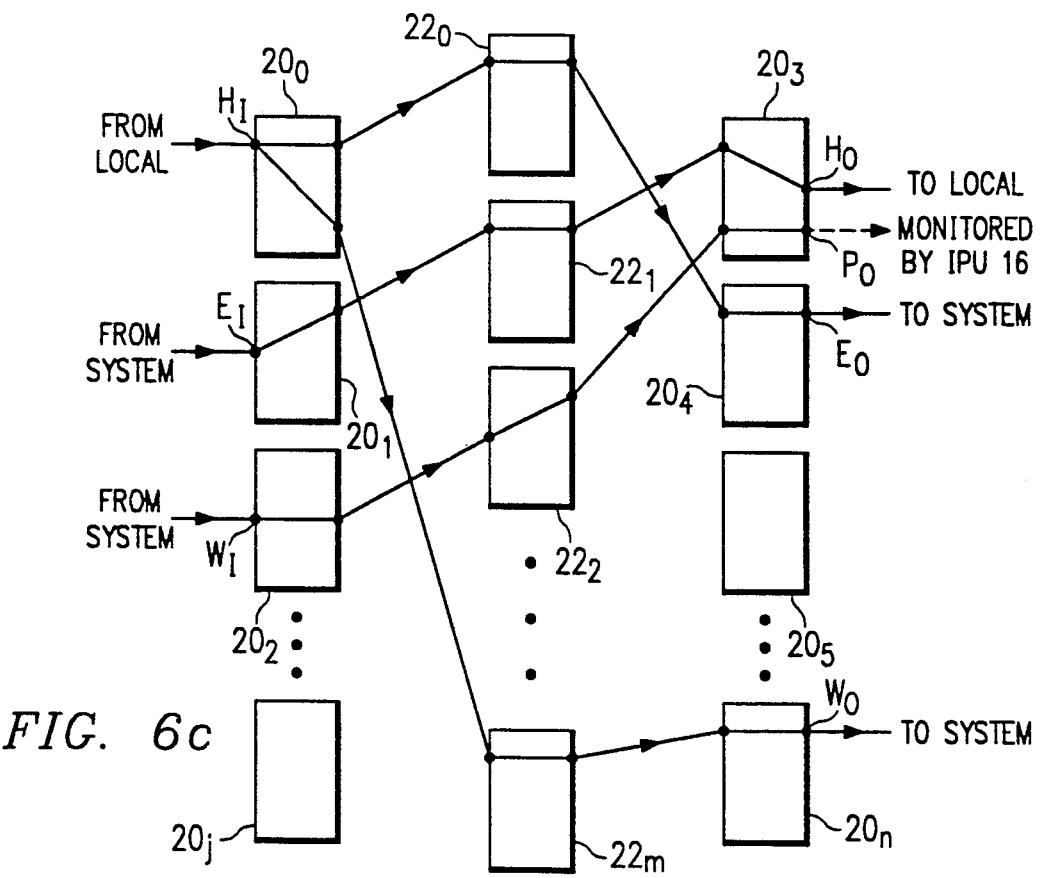

If the inactive port is acceptable (no hard errors and no soft error threshold crossings), IPU 16 associated with first/third stage $20_3$ performs a head-end switch to connect the inactive port to its protection output port $P_O$, in process 54. The result of this switch is illustrated in FIG. 6c, showing that traffic from the east input port $E_I$ is still routed to head output port $H_O$, while traffic from the west input port $W_I$ is routed to the protection output port $P_O$. IPU 16 associated with first/third stage $20_3$ then examines the traffic at protection port $P_O$, by checking the overhead data received thereat to determine if a threshold crossing is now being reported by west input port $W_I$. Of course, the presence of a hard error condition at this facility will also be detected in process 54, such as the LOS, LOF, AIS conditions.

In decision 55, the results of the monitoring of process 54 is determined. If the inactive port currently coupled to protection output port $P_O$ does not have an adequately clear signal, such as a hard error condition or a threshold crossing, no switching is effected, and control passes back to the monitor state (process 60).

If the inactive port currently connected to protection output port $P_O$ is clear, control then passes to process 50 by which the third stage head-end switch is made, connecting the previously inactive port to the head output port $H_O$. In the example of FIGS. 6a through 6c, the head-end switch is effected by IPU 16 causing first/third stage $20_3$ to connect west input port $W_I$ to head output port $H_O$. The result of the head-end switch of process 50 due to crossing of a soft error rate threshold is illustrated in FIG. 6b. Protection output port $P_O$ is also then freed for use in connection with any other head output ports served by first/third stage $20_3$.

Since the facility protection switch of process 50 was, in this case, due to excessive soft error rate (and since decision 55 has already determined if a threshold crossing from the new facility has occurred), decision 57 passes control directly to process 58 to report the head-end switch to APU 12, and to update the status register 42 for the previously active port (indicating a soft error threshold was exceeded) and for the newly active port (indicating a good condition). Control then passes back to the monitored state, via process 60.

As discussed above, the facility protection switching provided by this embodiment of the invention is unidirectional. Accordingly, in the event that a bidirectional fault (such as a cut line) occurs, the other cross-connect in the system will similarly respond, if it contains the same facility protection capability. In addition, it is of course contemplated that the monitoring and facility protection provided in this embodiment of the invention may be implemented for many of the ports serviced by a particular cross-connect, especially those for which a high grade of service is desired, such as for data communications.

As in the case of the first embodiment described hereinabove, this embodiment of the invention also provides the significant advantages of facility protection with fast switching times in the event of a hard failure, such switching times being on the order of 50 msec or less. In addition, the protection afforded by this embodiment of the invention is implemented not only for hard line failures, but also for hard failures affecting only a single facility, and also for excessive error rates exceeding a given threshold. In fiber optic networks, 1:1 line protection may be eliminated and the utilization of fiber optic lines for traffic improved. This facility protection is provided in a unidirectional manner, and uses blind switching which does not require handshaking communication with other cross-connects in the system, and thus is relatively simple and extremely fast.

In addition to the advantages provided by the first embodiment of the invention, this embodiment of the invention also allows for a high degree of flexibility in the assignment of ports within a cross-connect, as the east and west ports for a given path may each be physically located anywhere within the cross-connect. Accordingly, this embodiment of the invention is particularly well-suited for implementation into existing installations, as no rearrangement of port assignments is necessary.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of facility protection by a cross-connect in a telecommunications system, in which a facility is received by the cross-connect at one of first and second input ports from first and second redundant network lines, and is communicated to a head output port, and wherein the cross-connect is configured as a switching matrix of the Clos type having a first stage associated with each of the first and second input ports, a third stage associated with the head output port, and with a center stage for coupling the first and second input ports to the head output port, comprising the steps of:

monitoring the received facility at the first stage of the switching matrix associated with the first input port to detect an errored condition; and responsive to detecting an errored condition, connecting, at the third stage of the switching matrix associated with the head output port, the head output port to the second input port so that the head output port receives the facility from the second input port.

2. The method of claim 1, wherein the monitoring step comprises:
detecting coding violations in the received facility over a selected period of time, said errored condition including the number of detected coding violations exceeding a limit.

3. The method of claim 2, wherein said monitoring step further comprises:
detecting a hard error signal in the received facility.

4. The method of claim 1, wherein said cross-connect further comprises first and second output ports coupled to the first and second redundant network lines, and coupled to receive digital signals from a head input port;
further comprising:
broadcasting said digital signals received at the head input port at both of said first and second output ports onto the first and second network lines.

5. The method of claim 4,
wherein said broadcasting step is performed from a first stage of the switching matrix.

6. The method of claim 1, wherein said monitoring step further comprises:
after detecting an error condition, coupling the second input port to a protection output port; and
examining the facility at the protection output port;
and wherein said connecting step is performed responsive to the step of examining the facility at said protection output port.

7. A cross-connect system having facility protection capability, comprising:
a plurality of ports, including n east input port and a west input port for receiving a facility from east and west lines in a telecommunication system, and including a head output port for communicating the facility received at one of said east and west input ports to another network;
a central processing unit, coupled to a bus;
a cross-connect matrix of the Clos type, having first, center and third stages, said cross-connect matrix coupled to said bus; and
an interface processing unit coupled to said bus and to said east and west input ports, comprising:
a first interface processor coupled to a first stage of said cross-connect matrix associated with said east input port, for connecting a facility received thereat to a center stage of said cross-connect matrix, and for monitoring the received facility for an errored condition;
a second interface processor coupled to a first stage of said cross-connect matrix associated with said west input port, for connecting a facility received thereat to a center stage of said cross-connect matrix, and for monitoring the received facility for an errored condition; and
a third interface processor coupled to a third stage of said cross-connect matrix associated with said head output port, for coupling the third stage to one of said first stages to receive the facility from a first one of the east and west input ports, and for controlling the third stage to switch said head output port to receive the facility from a second one of said east and west input ports responsive to the monitoring performed by the interface processor associated with the first one of said east and west input ports indicating an errored condition.

8. The system of claim 7, wherein said interface processing unit further comprises:
a center interface processor coupled to the center stage of the cross-connect matrix to which the first stage is coupled by said first interface processor.

9. The system of claim 7,
wherein said interface processing unit further comprises:
a first first/third stage circuit associated with said east input port, controlled by said first interface processor;
a second first/third stage circuit associated with said west input port, controlled by said second interface processor; and
a third first/third stage circuit associated with said head output port, controlled by said third interface processor.

10. The system of claim 9, wherein said third first/third stage circuit is further associated with a protection output port;
and wherein, responsive to the monitoring performed by the interface processor associated with the first one of said east and west input ports indicating an errored condition, said third interface processor controls said third first/third stage circuit to switch said protection output port to receive the facility from the second one of said east and west input ports for monitoring.

11. A digital telecommunications system, comprising:
first and second transmission lines; and
a first cross-connect, comprising:
a plurality of ports, including first and second input ports for receiving a first facility from said first and second transmission lines, respectively, and including a head output port for presenting the first facility;
a central processing unit, coupled to a bus;
a cross-connect matrix of the Clos matrix type, having first, center and third stages, and coupled to said bus;
an interface processing unit coupled to said bus and to said first and second input ports, for connecting the facility received at one of said first and second input ports to said cross-connect matrix, for monitoring the first facility to detect an error condition, and for switching to connect the other of said first and second input ports to said cross-connect matrix responsive to detecting the error condition, comprising:
a plurality of interface processors; and
a plurality of first/third stage circuits, each coupled to an associated one of said plurality of interface processors;
wherein said first input port corresponds to a first one of said first/third stage circuits, controlled by a first one of said plurality of interface processors so that a facility received at the first input port is monitored for detection of an 12. The system of claim 11, wherein said first cross-connect further comprises:
first and second output ports, for broadcasting a second facility to said first and second transmission lines, respectively, from digital signals received at a head input port, said first and second output ports coupled to said head input port via said cross-connect matrix.

13. The system of claim 12, further comprising:
a second cross-connect, comprising:
   a plurality of ports, including first and second input ports for receiving the second facility from said first and second transmission lines, respectively, and first and second output ports for broadcasting the first facility to said first and second transmission lines, respectively, including a head output port for presenting the second facility and a head input port for receiving digital signals corresponding to the first facility;
   a central processing unit, coupled to a bus;
   a cross-connect matrix, coupled to said bus; error condition at said first one of said plurality of first/third stage circuits;
   wherein said second input port corresponds to a second one of said first/third stage circuits, controlled by a second one of said plurality of interface processors;
   and wherein said first and second ones of said first/third stage circuits are coupled to a third one of said first/third stage circuits corresponding to said head output port, controlled by a third one of said plurality of interface processors so that, responsive to the detection of an error condition in the monitored facility received at the first input port, the third first/third stage switches said head output port to receive the facility from said second input port.
   an interface processing unit coupled to said bus and to said first and second input ports, for connecting the second facility received at one of said first and second input ports to said cross-connect matrix, for monitoring the second facility to detect an error condition, and for switching to connect the other of said first and second input ports to said cross-connect matrix responsive to detecting the error condition.

14. A method of providing line protection for a telecommunications system including a fiber optic line in such a manner as to eliminate the need for providing a redundant fiber optic line, comprising:
   providing a redundant route relative to the fiber optic line;
   broadcasting a facility over the fiber optic line and the redundant route to a cross-connect configured as a switching matrix of the Clos type, the cross-connect having first and second ports coupled to the fiber optic line and to the redundant route, respectively, the cross-connect having a head port for presenting the received facility, the head port coupled via a cross-connect matrix to the first port;
   monitoring the received facility at a first stage of said switching matrix associated with the first port to detect an errored condition; and
   responsive to detecting an errored condition, connecting the head port to the second port to receive the facility thereat by switching a third stage of the switching matrix which is associated with the head port and which is coupled to the first and second ports by way of center stages of the switching matrix.

* * * * *

UNITED STATES PATENT AND TRADEMARK OFFICE
CERTIFICATE OF CORRECTION

PATENT NO. : 5,329,520
DATED : July 12, 1994
INVENTOR(S) : C. Douglas Richardson It is certified that error appears in the above-indentified patent and that said Letters Patent is hereby corrected as shown below:

Col. 7, ln. 43, delete "cross-connect-2", insert --cross-connect 2--.

Col. 8, ln. 44, delete "detected i.e.,", insert --detected (i.e.,--

Col. 10, lns. 11-12, delete "H $_0$of", insert --$H_0$ of--.

Col. 14, ln. 21, delete "He", insert --$H_0$--.

Col. 14, ln. 29, delete "He", insert --$H_0$--.

Col. 17, ln. 36, delete "n", insert --an--.

Col. 18, ln. 62, after "an", insert --error condition at said first one of said plurality of first/third stage circuits;

wherein said second input port corresponds to a second one of said first/third stage circuits, controlled by a second one of said plurality of interface processors;

and wherein said first and second ones of said first/third stage circuits are coupled to a third one of said first/third stage circuits corresponding to said head output port, controlled by a third one of said plurality of interface

UNITED STATES PATENT AND TRADEMARK OFFICE
CERTIFICATE OF CORRECTION

PATENT NO. : 5,329,520    Page 2 of 3
DATED : July 12, 1994
INVENTOR(S) : C. Douglas Richardson It is certified that error appears in the above-indentified patent and that said Letters Patent is hereby corrected as shown below:

processors so that, responsive to the detection of an error condition in the monitored facility received at the first input port, the third first/third stage switches said head output port to receive the facility from said second input port.--

Col. 19, ln. 15, delete "error condition at said first one of said plurality of first/third stage circuits;

wherein said second input port corresponds to a second one of said first/third stage circuits, controlled by a second one of said plurality of interface processors;

and wherein said first and second ones of said first/third stage circuits are coupled to a third one of said first/third stage circuits corresponding to said head output port, controlled by a third one of said plurality of interface processors so that, responsive to the detection of an error condition in the monitored facility received at the first

UNITED STATES PATENT AND TRADEMARK OFFICE
CERTIFICATE OF CORRECTION

PATENT NO. : 5,329,520
DATED : July 12, 1994
INVENTOR(S) : C. Douglas Richardson It is certified that error appears in the above-indentified patent and that said Letters Patent is hereby corrected as shown below:

input port, the third first/third stage switches said head output port to receive the facility from said second input port."

Signed and Sealed this

Twenty-third Day of July, 1996

Attest:

BRUCE LEHMAN

Attesting Officer

Commissioner of Patents and Trademarks